US012469940B2

(12) United States Patent
Ding et al.

(10) Patent No.: US 12,469,940 B2
(45) Date of Patent: Nov. 11, 2025

(54) PHASE SHIFTER, PHASE SHIFTER ARRAY, ANTENNA ARRAY AND ELECTRONIC DEVICE

(71) Applicants: Beijing BOE Sensor Technology Co., Ltd., Beijing (CN); BOE TECHNOLOGY GROUP CO., LTD., Beijing (CN)

(72) Inventors: Yi Ding, Beijing (CN); Zhao Cui, Beijing (CN); Yong Ma, Beijing (CN); Feng Qu, Beijing (CN); Qi Yao, Beijing (CN); Chuncheng Che, Beijing (CN)

(73) Assignees: Beijing BOE Sensor Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/279,381

(22) PCT Filed: Nov. 9, 2022

(86) PCT No.: PCT/CN2022/130817

§ 371 (c)(1),
(2) Date: Aug. 29, 2023

(87) PCT Pub. No.: WO2024/098275

PCT Pub. Date: May 16, 2024

(65) Prior Publication Data

US 2025/0087865 A1 Mar. 13, 2025

(51) Int. Cl.

| | |
|---|---|
| ***H01P 1/18*** | (2006.01) |
| ***G02F 1/1343*** | (2006.01) |
| ***H01Q 3/36*** | (2006.01) |

(52) U.S. Cl.

CPC .......... *H01P 1/18* (2013.01); *G02F 1/134309* (2013.01); *H01Q 3/36* (2013.01)

(58) Field of Classification Search

CPC .... G02F 1/13; G02F 1/134309; G02F 1/1313; G02F 1/1343; G02F 2203/50;

(Continued)

(56) References Cited

U.S. PATENT DOCUMENTS 11,158,916 B2 * 10/2021 Wu ........................ H01Q 1/241
2019/0363452 A1 11/2019 Ting et al.

(Continued)

FOREIGN PATENT DOCUMENTS

CN 107528121 A 12/2017
CN 110824734 A 2/2020

(Continued)

*Primary Examiner* — John W Poos
(74) *Attorney, Agent, or Firm* — HOUTTEMAN LAW LLC

(57) ABSTRACT

A phase shifter, a phase shifter array, an antenna array and an electronic device are provided and belong to the field of communication technology. The phase shifter includes: first and second dielectric substrates opposite to each other, a first transmission line and a second transmission line on a side of the first dielectric substrate close to the second dielectric substrate, patch electrodes on a side of the second dielectric substrate close to the first dielectric substrate, and a tunable dielectric layer between a layer where the transmission lines are located and a layer where the patch electrodes are located; wherein orthographic projections of two ends of each patch electrode on the first dielectric substrate overlap with orthographic projections of the first and second transmission lines on the first dielectric substrate, respectively; and at least two of the plurality of patch electrodes are connected to different first bias voltage lines.

20 Claims, 6 Drawing Sheets

(58) Field of Classification Search

CPC .... H04B 7/185; H04B 7/2041; H04B 1/3827; H04B 1/40; H04B 15/04; H04B 7/0482; H04B 7/0639; H04B 7/10; H01P 1/18; H01P 1/181; H01P 1/184; H01P 1/182; H01P 1/20; H01P 11/00; H01P 7/08; H01Q 3/36; H01Q 21/065; H01Q 1/50; H01Q 1/38; H01Q 1/48; H01Q 3/26; H01Q 9/0414; H01Q 21/0012; H01Q 21/24; H01Q 3/34; H01Q 9/0442; H01Q 1/22; H01Q 3/44; H01Q 1/00; H01Q 1/02; H01Q 1/2283; H01Q 1/243; H01Q 1/526; H01Q 21/0006; H01Q 21/061; H01Q 21/22; H01Q 23/00; H01Q 25/001; H01Q 3/24; H01Q 5/47; H01Q 15/002; H01Q 15/0086; H01Q 19/185; H01Q 21/08; H01Q 9/0407; H01Q 9/045; H01Q 9/16; H01Q 9/285

See application file for complete search history.

(56) References Cited

U.S. PATENT DOCUMENTS

| | | | | |
|---|---|---|---|---|
| 2021/0080765 | A1* | 3/2021 | Hu | H01P 1/184 |
| 2021/0109636 | A1 | 4/2021 | Lius et al. | |
| 2021/0408680 | A1* | 12/2021 | Xi | H01P 1/184 |
| 2023/0352804 | A1* | 11/2023 | Liu | H01P 1/18 |

FOREIGN PATENT DOCUMENTS

| | | | |
|---|---|---|---|
| CN | 112448105 | A | 3/2021 |
| CN | 113488771 | A | 10/2021 |
| CN | 113594669 | A | 11/2021 |
| CN | 113728512 | A | 11/2021 |
| CN | 114696058 | A | 7/2022 |
| JP | 2017106984 | A | 6/2017 |
| WO | 2021104202 | A1 | 6/2021 |
| WO | 2022032889 | A1 | 2/2022 |
| WO | 2022110013 | A1 | 6/2022 |
| WO | 2022178805 | A1 | 9/2022 |

* cited by examiner

PHASE SHIFTER, PHASE SHIFTER ARRAY, ANTENNA ARRAY AND ELECTRONIC DEVICE

TECHNICAL FIELD

The present disclosure relates to the field of communication technology, and in particular to a phase shifter, a phase shifter array, an antenna array and an electronic device.

BACKGROUND

A liquid crystal phase shifter periodically introduces a liquid crystal capacitor, and a dielectric constant of a liquid crystal layer is adjusted by controlling orientation of liquid crystals, thereby adjusting a total capacitance of a branch in unit length and further achieving the phase shifting function. In a traditional design for the liquid crystal phase shifter, in order to meet the requirements of an impedance matching, an operating bandwidth, a phase shifting efficiency and the like, adjustable design parameters mainly include an area of an overlapping capacitor and a distance between capacitors. For the control of liquid crystals filled in the overlapping capacitor, only a single driving signal is usually adopted to uniformly adjust the rotation of liquid crystal molecules in all the overlapping capacitors.

SUMMARY

The present disclosure is directed to at least one of the problems in the prior art, and provides a phase shifter, a phase shifter array, an antenna array and an electronic device.

In a first aspect, an embodiment of the present disclosure provides a phase shifter, including: a first dielectric substrate and a second dielectric substrate opposite to each other, a first transmission line and a second transmission line on a side of the first dielectric substrate close to the second dielectric substrate, a plurality of patch electrodes on a side of the second dielectric substrate close to the first dielectric substrate, and a tunable dielectric layer between a layer where the first transmission line and the second transmission line are located and a layer where the plurality of patch electrodes are located: wherein orthographic projections of two ends of each of the plurality of patch electrodes on the first dielectric substrate overlap with orthographic projections of the first transmission line and the second transmission line on the first dielectric substrate, respectively; and wherein at least two of the plurality of patch electrodes are connected to different first bias voltage lines.

In some embodiments, the plurality of patch electrodes are connected to different first bias voltage lines, respectively.

In some embodiments, at least two of the plurality of patch electrodes are connected to a same first bias voltage line, and the patch electrodes connected to the same first bias voltage line are adjacent to each other.

In some embodiments, every two adjacent patch electrodes of the plurality of patch electrodes are connected to a same first bias voltage line, and different first bias voltage lines are connected to different patch electrodes, respectively.

In some embodiments, patch electrodes of the plurality of patch electrodes connected to the same first bias voltage line are separated from each other by at least one patch electrode.

In some embodiments, each of some first bias voltage lines includes a first sub-signal line and a second sub-signal line which are sequentially arranged in a direction away from the second dielectric substrate; and the phase shifter further includes a first interlayer insulating layer between a layer where the second sub-signal line is located and a layer where the first sub-signal line is located; the first sub-signal line and the second sub-signal line are electrically connected to each other by a via extending through the first interlayer insulating layer, and the first sub-signal line is electrically connected to the patch electrodes.

In some embodiments, each of the plurality of patch electrodes is connected to the corresponding first bias voltage line through a switching unit, and different patch electrodes are connected to different switching units, and the switching units connected to the same first bias voltage line are connected to different scanning lines.

In some embodiments, switching units connected to odd-numbered patch electrodes are connected to a same scanning line, and switching units connected to even-numbered patch electrodes are connected to a same scanning line.

In some embodiments, each switching unit includes a thin film transistor: a first electrode of the thin film transistor is electrically connected to the first bias voltage line, a second electrode of the thin film transistor is electrically connected to the patch electrode, and a control electrode of the thin film transistor is electrically connected to the scanning line.

In some embodiments, each first bias voltage line includes a first sub-signal line and a second sub-signal line which are sequentially arranged in a direction away from the second dielectric substrate; and the phase shifter further includes a first interlayer insulating layer between a layer where the second sub-signal line is located and a layer where the first sub-signal line is located: a first end of the first sub-signal line is connected to the patch electrode, a second end of the first sub-signal line is connected to a first connection portion: a first end of the second sub-signal line is connected to a second connection portion, and the first connection portion is connected to the second connection portion through a via extending through the first interlayer insulating layer: a line width of the first connection portion is greater than that of the first sub-signal line, and a line width of the second connection portion is greater than that of the second sub-signal line.

In some embodiments, the first sub-signal line and the second sub-signal line are both made of metal.

In some embodiments, the phase shifter further includes a signal electrode on a side of the first dielectric substrate close to the second dielectric substrate, wherein the first transmission line and the second transmission line are respectively on both sides of an extending direction of the signal electrode.

In some embodiments, the phase shifter further includes a second bias voltage line electrically connected to the first transmission line and the second transmission line.

In a second aspect, an embodiment of the present disclosure provides a phase shifter array, which includes a plurality of phase shifters arranged in an array, where each phase shifter adopts the phase shifter in any one of the embodiments.

In some embodiments, when each of the plurality of patch electrodes is connected to the corresponding first bias voltage line through the corresponding switching unit, the phase shifters in the same row are arranged such that switching units connected to odd-numbered patch electrodes in each phase shifter are connected to a same scanning line, switching units connected to even-numbered patch electrodes in each phase shifter are connected to a same scanning line; and/or the phase shifters in the same column are arranged such that the patch electrodes are correspondingly connected to the same first bias voltage line in each phase shifter in the arrangement order.

In a third aspect, an embodiment of the present disclosure provides an antenna array, which includes the phase shifter array in any one of the embodiments.

In some embodiments, the antenna array further includes a radiating array including a plurality of radiating units in one-to-one correspondence with the plurality of phase shifters in the phase shifter array.

In some embodiments, the antenna array further includes a feed network configured to feed the phase shifter array.

In some embodiments, the feed network feeds the phase shifter array by adopting any one of a coupling slit, a waveguide or a conductive via.

In a fourth aspect, an embodiment of the present disclosure provides an electronic device, which includes the antenna array in any one of the embodiments.

DETAIL DESCRIPTION OF EMBODIMENTS

In order to enable one of ordinary skill in the art to better understand the technical solutions of the present disclosure, the present disclosure will be described in further detail with reference to the accompanying drawings and the detailed description.

Unless defined otherwise, technical or scientific terms used herein shall have the ordinary meaning as understood by one of ordinary skill in the art to which the present disclosure belongs. The terms “first”, “second”, and the like used in the present disclosure are not intended to indicate any order, quantity, or importance, but rather are used for distinguishing one element from another. Further, the term “a”, “an”, “the”, or the like used herein does not denote a limitation of quantity, but rather denotes the presence of at least one element. The term of “comprising”, “including”, or the like, means that the element or item preceding the term contains the element or item listed after the term and its equivalent, but does not exclude other elements or items. The term “connected”, “coupled”, or the like is not limited to physical or mechanical connections, but may include electrical connections, whether direct or indirect connections. The terms “upper”, “lower”, “left”, “right”, and the like are used only for indicating relative positional relationships, and when the absolute position of an object being described is changed, the relative positional relationships may also be changed accordingly.

Figure 1:
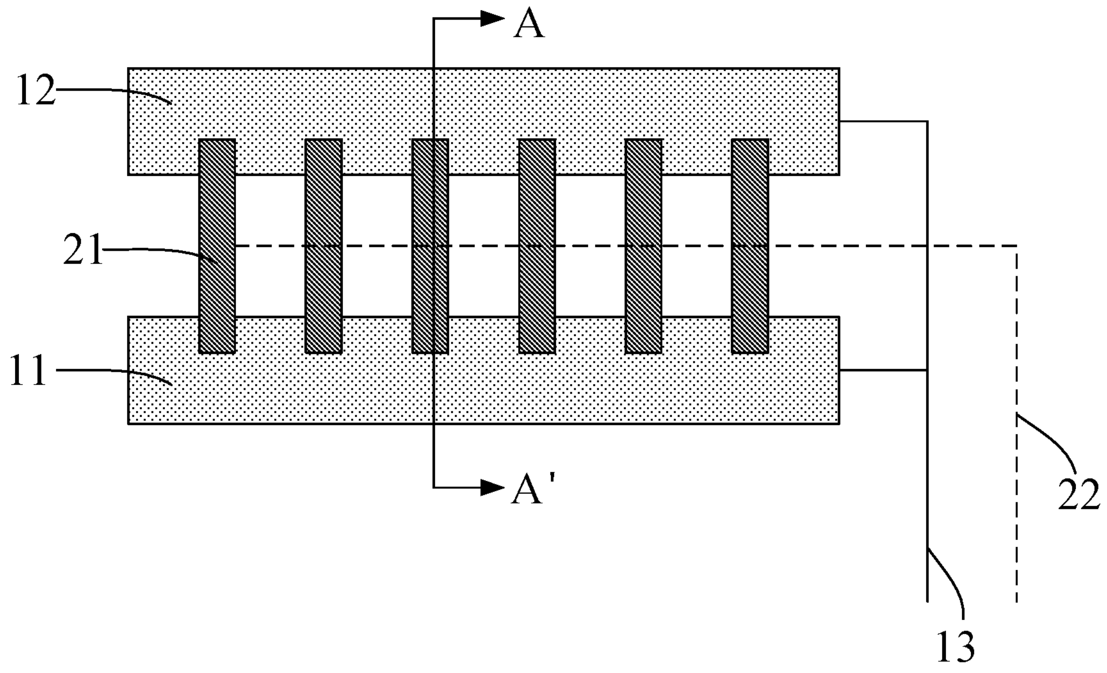
FIG. 1 is a top view of an exemplary phase shifter.
Figure 2:
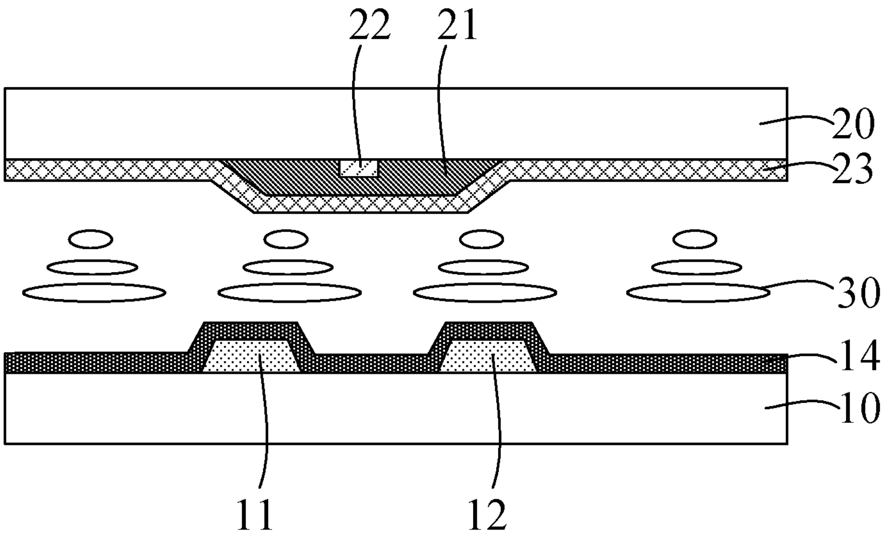
FIG. 2 is a cross-sectional view along a line A-A' of FIG. 1.

FIG. 1 is a top view of an exemplary phase shifter. FIG. 2 is a cross-sectional view along a line A-A' of FIG. 1. As shown in FIGS. 1 and 2, the phase shifter includes: a first dielectric substrate 10 and a second dielectric substrate 20 opposite to each other, a first transmission line 11 and a second transmission line 12 arranged on a side of the first dielectric substrate 10 close to the second dielectric substrate 20, a plurality of patch electrodes 21 arranged on a side of the second dielectric substrate 20 close to the first dielectric substrate 10, and a tunable dielectric layer arranged between a layer where the first transmission line 11 and the second transmission line 12 are located and a layer where the plurality of patch electrodes 21 are located. Orthographic projections of two ends of any patch electrode 21 on the first dielectric substrate 10 overlap with orthographic projections of the first transmission line 11 and the second transmission line 12 on the first dielectric substrate 10, respectively.

In some examples, the tunable dielectric layer includes, but is not limited to, a liquid crystal layer 30. The tunable dielectric layer the liquid crystal layer 30 in the embodiments of the present disclosure, as an example. The plurality of patch electrodes 21 may be electrically connected together by a first bias voltage line 22, and the first transmission line 11 and the second transmission line 12 may be electrically connected together by a second bias voltage line 13. For example, a second bias voltage written into the second bias voltage line 13 is a ground voltage. The orthographic projections of the two ends of any patch electrode 21 on the first dielectric substrate 10 at least partially overlap with the orthographic projections of the first transmission line 11 and the second transmission line 12 on the first dielectric substrate 10, respectively, to define a capacitor region. At this time, the patch electrode 21 respectively forms overlapping capacitors with the first transmission line 11 and the second transmission line 12 in the capacitor region. By applying a first bias voltage to the patch electrodes 21 and applying a second bias voltage to the first transmission line 11 and the second transmission line 12, an electric field is formed in the capacitor region to rotate liquid crystal molecules of the liquid crystal layer 30, so that the dielectric constant of the liquid crystal layer 30 is changed, and phase adjustment of microwave signals is further achieved.

The inventor found that the patch electrodes 21 are electrically connected together by the same first bias voltage line 22, so that in order to meet the requirements of an impedance matching, an operating bandwidth, a phase shifting efficiency and the like, adjustable design parameters are mainly concentrated on an area of an overlapping capacitor and a distance between capacitors. For the control of liquid crystal materials filled in the overlapping capacitor, a single driving signal is usually only adopted to uniformly adjust the rotation of liquid crystal molecules in all the overlapping capacitors. Thus, a freedom degree in designing the phase shifter is greatly limited.

In view of the above problems, the following technical solution is provided in the embodiments of the present disclosure.

Figure 3:
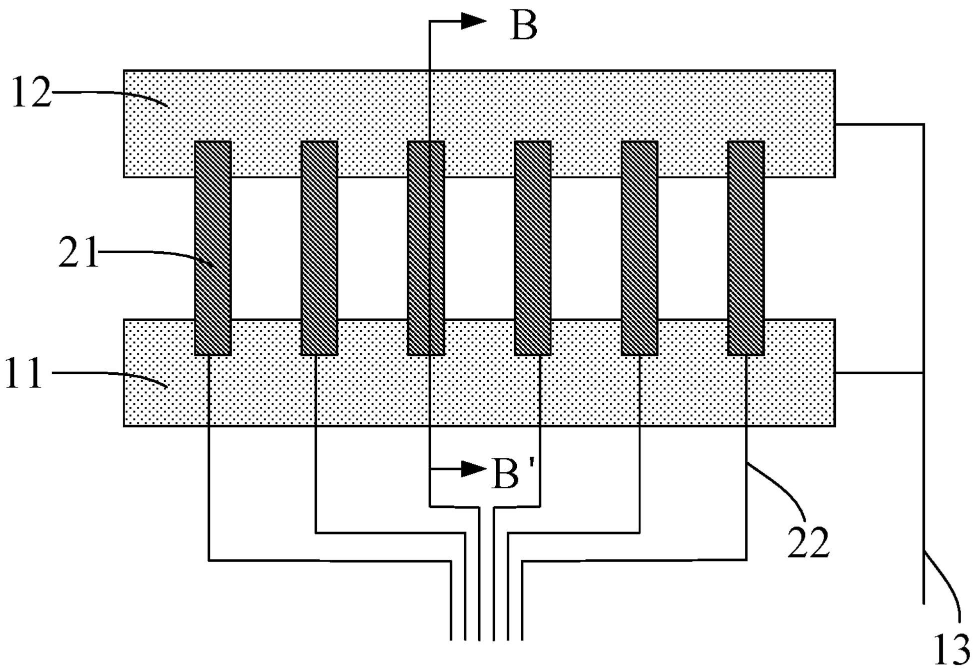
FIG. 3 is a top view of a phase shifter according to an embodiment of the present disclosure.

In a first aspect, FIG. 3 is a top view of a phase shifter according to an embodiment of the present disclosure. FIG.

Figure 4:
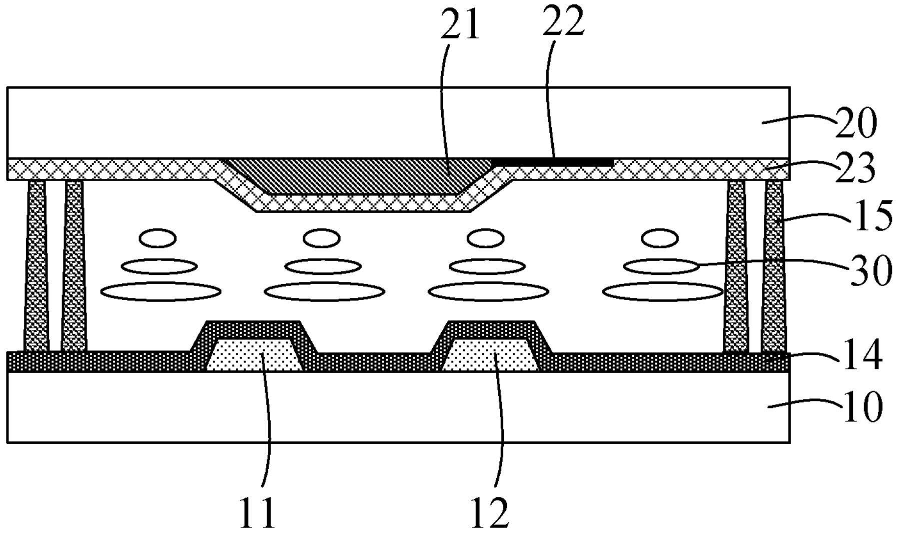
FIG. 4 is a cross-sectional view along a line B-B' of FIG. 3.

4 is a cross-sectional view along a line B-B" of FIG. 3. As shown in FIGS. 3 and 4, an embodiment of the present disclosure provides a phase shifter, which includes a first dielectric substrate 10 and a second dielectric substrate 20 opposite to each other, a first transmission line 11 and a second transmission line 12 arranged on a side of the first dielectric substrate 10 close to the second dielectric substrate 20, a plurality of patch electrodes 21 arranged on a side of the second dielectric substrate 20 close to the first dielectric substrate 10, and a tunable dielectric layer arranged between a layer where the first transmission line 11 and the second transmission line 12 are located and a layer where the plurality of patch electrodes 21 are located. Orthographic projections of two ends of any patch electrode 21 on the first dielectric substrate 10 overlap with orthographic projections of the first transmission line 11 and the second transmission line 12 on the first dielectric substrate 10, respectively. In particular, in the embodiment of the present disclosure, at least two of the plurality of patch electrodes 21 are connected to different first bias voltage lines 22.

It should be noted that in the embodiment of the present disclosure, as an example, the tunable dielectric layer is the liquid crystal layer 30, and the first transmission line 11 and the second transmission line 12 are applied with a ground voltage.

In the embodiment of the present disclosure, the at least two of the plurality of patch electrodes 21 are connected to different first bias voltage lines 22, so that different first bias voltages may be applied to the patch electrodes 21 connected to different first bias voltage lines 22, and thus, the liquid crystal molecules in a corresponding capacitor region are rotated to different degrees, and different dielectric constants are exhibited, and the corresponding capacitor region obtains different capacitance values. In this way, a design variable can be added in the design for the phase shifter, improving the design freedom degree: the impedance matching of the phase shifter is optimized to a certain extent through sacrificing a part of adjustable performance of the liquid crystal layer 30, and the operating bandwidth is expanded. Meanwhile, a processing tolerance inevitably exists in the manufacturing process for the phase shifter, so that there are different levels of deviation between areas of the overlapping capacitors and the design value. Based on the design scheme of the embodiment of the present disclosure, the dielectric constants of the liquid crystal molecules of each overlapping capacitor are correspondingly adjusted according to an actual size deviation of the overlapping capacitor, to compensate for the capacitance value.

In some examples, the patch electrodes 21 may be arranged periodically along an extending direction of the first transmission line 11. For example: a pitch between any two adjacent patch electrodes 21 is constant. Alternatively, the pitch between any two adjacent patch electrodes 21 may be also monotonically increased or decreased according to a certain rule.

In some examples, two ends for any patch electrode 21 are referred to as a first end and a second end, respectively. A capacitor region defined by an orthographic projection of the first end of the patch electrode 21 on the first dielectric substrate 10 overlapping with an orthographic projection of the first transmission line 11 on the first dielectric substrate 10 is a first capacitor region, and a capacitor region defined by an orthographic projection of the second end of the patch electrode 21 on the first dielectric substrate 10 overlapping with an orthographic projection of the second transmission line 12 on the first dielectric substrate 10 is a second capacitor region. The first capacitor regions and the second capacitor regions are in a one-to-one correspondence with each other, and the first capacitor region and the second capacitor region corresponding to each other have the same area.

Further, areas of the first capacitor regions may be the same, or at least two of the first capacitor regions may have different areas. For example: when at least two of the first capacitor regions have different areas, in a direction from two ends pointing to the midpoint of the first transmission line 11, an area of the first capacitor region close to the midpoint is not less than that of the first capacitor region away from the midpoint. Still further, at least two of the first capacitor regions may have different areas, including, but not limited to, at least two first capacitor regions having different widths, at least two first capacitor regions having different lengths. At least two of the patch electrodes 21 have different widths, so that at least two first capacitor regions have different widths; At least two of the patch electrodes 21 have different lengths, so that at least two first capacitor regions have different lengths.

Similarly, areas of the second capacitor regions may also be set in the same manner as those of the first capacitor regions, and are not repeated herein.

In some examples, the phase shifter according to the embodiment of the present disclosure may further include a first protective layer 14 disposed on a side of the layer where the first transmission line 11 and the second transmission line 12 are located close to the liquid crystal layer 30, a second protective layer 23 disposed on a side of a layer where a signal electrode 17 is located close to the liquid crystal layer 30, and support posts 15 each having two ends abutting against the first protective layer 14 and the second protective layer 23. The first protective layer 14 is used for protecting the first transmission line 11 and the second transmission line 12, the second protective layer 23 is used for protecting the patch electrodes 21: the first protective layer 14 and the second protective layer 23 may be made of silicon nitride: the support posts 15 are used for maintaining a cell gap of the liquid crystal and may be made of resin material.

The phase shifter in the embodiments of the present disclosure is described below with reference to specific examples.

In a first example, referring to FIGS. 3 and 4, the patch electrodes 21 in the phase shifter are connected to the first bias voltage lines 22 in a one-to-one correspondence. With this structure, each of the patch electrodes 21 may be applied with a first bias voltage through the independent first bias voltage line 22, so that a capacitance value of the overlapping capacitor formed by each of the patch electrodes 21 and the first and second transmission lines 11 and 12 may be controlled by controlling a magnitude of the voltage applied to the first bias voltage lines 22. In this way, a design variable can be added in the design for the phase shifter, improving the design freedom degree In some examples, the first transmission line 11, the second transmission line 12, and the patch electrodes 21 may each be made of a metal material, such as: copper, aluminum, molybdenum, or aluminum/molybdenum, or the like. The first bias voltage lines 22 and a second bias voltage line 13 may be made of a transparent conductive material, such as indium tin oxide, or the like. Further, the first bias voltage line 22 is disposed on a side of the layer where the patch electrodes 21 are located close to the second dielectric substrate 20, and the second bias voltage line 13 is disposed on a side of the first transmission line 11 and the second transmission line 12 close to the first dielectric substrate 10.

In some examples, in addition to the above structure, the phase shifter further includes a first flexible circuit board: a plurality of first connection pads are provided on a side of the second dielectric substrate 20 close to the liquid crystal layer 30, and the first bias voltage lines 22 are connected to the first connection pads in a one-to-one correspondence, and the first flexible circuit board is bonded and connected to the first connection pads, so that the first flexible circuit board may apply the first bias voltage to the first bias voltage lines 22 through the first connection pads. Further, a second connection pad may be further disposed on a side of the second dielectric substrate 20 close to the liquid crystal layer 30, the second bias voltage line 13 may be electrically connected to the second connection pad through an ACF glue between the first dielectric substrate 10 and the second dielectric substrate 20, the second connection pad may also be electrically connected to the first flexible circuit board, and the first flexible circuit board may apply a second bias voltage (the ground voltage) to the second bias voltage line 13 through the second connection pad. Alternatively, a second flexible circuit board may also be disposed in the phase shifter according to the embodiment of the present disclosure, the second connection pad is disposed on a side of the first dielectric substrate 10 close to the liquid crystal layer 30, the second bias voltage line is electrically connected to the second connection pad, and the second flexible circuit board is bonded and connected to the second bias voltage line.

Figure 5:
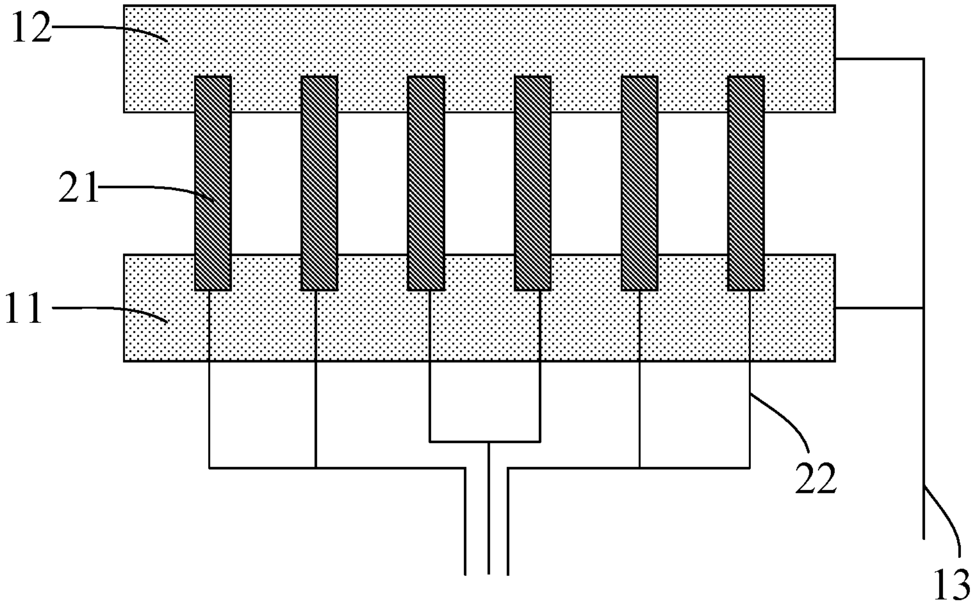
FIG. 5 is a top view of a phase shifter in a second example according to an embodiment of the present disclosure.

In a second example, FIG. 5 is a top view of a phase shifter in a second example according to an embodiment of the present disclosure. As shown in FIG. 5, in this example, at least two of the plurality of patch electrodes 21 are connected to the same first bias voltage line 22, and the patch electrodes 21 connected to the same first bias voltage line 22 are adjacently disposed. For example: every two adjacent patch electrodes 21 are connected to the same first bias voltage line 22, and the patch electrodes 21 connected to different first bias voltage lines 22 are different. In FIG. 5, only two patch electrodes 21 are connected to each first bias voltage line 22 as an example. Alternatively, each first bias voltage line may also be connected to three or more patch electrodes 21, which are not listed here. In this case, the number of the first bias voltage lines 22 can be reduced to facilitate wiring, and the requirement for the number of ports of the printed circuit can be reduced, to reduce the cost.

For the phase shifter in the second example, except for the setting of the first bias voltage lines 22, other structures may be arranged in the same manner as in the first example, and therefore, the description thereof is not repeated.

Figure 6:
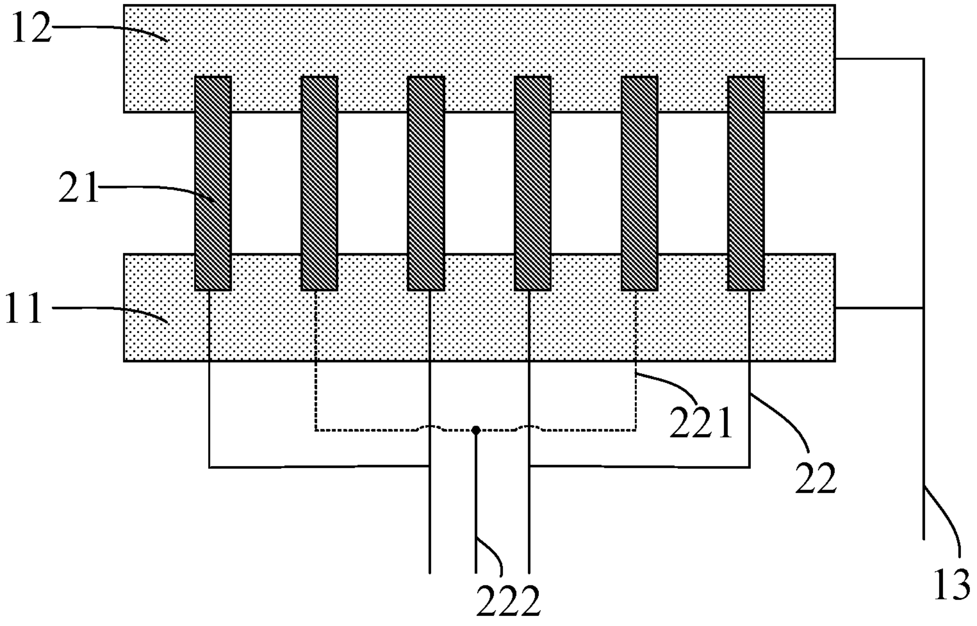
FIG. 6 is a top view of a phase shifter in a third example according to an embodiment of the present disclosure.

In a third example: FIG. 6 is a top view of a phase shifter in a third example according to an embodiment of the present disclosure. As shown in FIG. 6, in this example, at least two of the plurality of patch electrodes 21 are connected to the same first bias voltage line 22, and the patch electrodes 21 connected to the same first bias voltage line 22 are separated from each other by at least one patch electrode 21, and different first bias voltage lines 22 are connected to different patch electrodes 21. For example: referring to FIG. 6, the phase shifter includes six patch electrodes 21, which are the first to the sixth patch electrodes 21 sequentially disposed in the left to right direction in the figure, wherein the first patch electrode 21 and the third patch electrode 21 are connected to a first bias voltage line 22, the second patch electrode 21 and the fifth patch electrode 21 are connected to a first bias voltage line 22, and the fourth patch electrode 21 and the sixth patch electrode 21 are connected to a first bias voltage line 22.

With reference to FIG. 6, the adjacent patch electrodes 21 are connected to different first bias voltage lines 22, and at least one patch electrode 21 is disposed between the patch electrodes 21 connected to the same first bias voltage line 22, so that in order to avoid a short circuit between the first bias voltage lines 22, some first bias voltage lines 22 each adopt a structure including a first sub-signal line 221 and a second sub-signal line 222 in different layers and electrically connected to each other. Specifically, each of the some first bias voltage lines 22 includes a first sub-signal line 221 and a second sub-signal line 222 which are sequentially arranged in a direction away from the second dielectric substrate 20; and a first interlayer insulating layer is provided between a layer where the second sub-signal line 222 is located and a layer where the first sub-signal line 221 is located: the first sub-signal line 221 and the second sub-signal line 222 are electrically connected to each other by a via extending through the first interlayer insulating layer, while the first sub-signal line 221 is electrically connected to the patch electrodes 21. The second sub-signal line 222 is disposed in the same layer as other first bias voltage lines 22. For example: the first bias voltage line 22 connecting the second and the fifth patch electrodes 21 is formed by electrically connecting the first sub-signal line 221 and the second sub-signal line 222, and the second sub-signal line 222 is disposed in the same layer as the remaining two first bias voltage lines 22.

For the phase shifter in the third example, except for the setting of the first bias voltage lines 22, other structures may be arranged in the same manner as in the first example, and therefore, the description thereof is not repeated.

Figure 7:
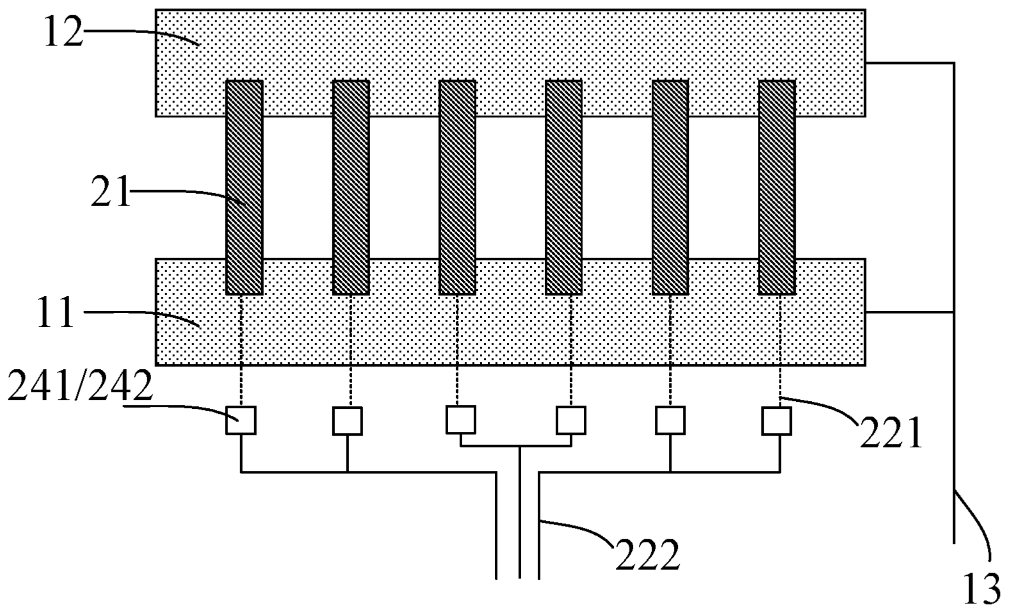
FIG. 7 is a top view of a phase shifter in a fourth example according to an embodiment of the present disclosure.

In a fourth example: FIG. 7 is a top view of a phase shifter in a fourth example according to an embodiment of the present disclosure. As shown in FIG. 7, in this example, the phase shifter is substantially the same in structure as the phase shifter in the second example, except that the first bias voltage line 22 includes a first sub-signal line 221 and a second sub-signal line 222 which are sequentially arranged in a direction away from the second dielectric substrate 20; and a first interlayer insulating layer is provided between the layer where the second sub-signal line 222 is located and the layer where the first sub-signal line 221 is located: a first end of the first sub-signal line 221 is connected to a patch electrode 21, a second end of the first sub-signal line 221 is connected to a first connection portion 241: a first end of the second sub-signal line 222 is connected to a second connection portion 242, and the first connection portion 241 is connected to the second connection portion 242 through a via extending through the first interlayer insulating layer: a line width of the first connection portion 241 is greater than that of the first sub-signal line 221, and a line width of the second connection portion 242 is greater than that of the second sub-signal line 222. The connection between first and second sub-signal lines 221 and 222 is realized by the first and second connection portions 241 and 242, ensuring the reliability of the connection.

In some examples, the first sub-signal line 221 and the second sub-signal line 222 may be made of the same material, and both may be made of a metal material, such as copper. Alternatively, the materials of the first sub-signal line 221 and the second sub-signal line 222 may be different.

In some examples, the first bias voltage line 22 in the embodiment of the present disclosure may also be formed by sequentially connecting more sub-signal lines in series, and the plurality of sub-signal lines may be made of the same material, or partially be made of the different materials and partially be made of the same material, or the materials of the sub-signal lines may be different from each other.

For the phase shifter in the fourth example, except for the setting of the first bias voltage lines 22, other structures may be arranged in the same manner as in the first example, and therefore, the description thereof is not repeated.

Figure 8:
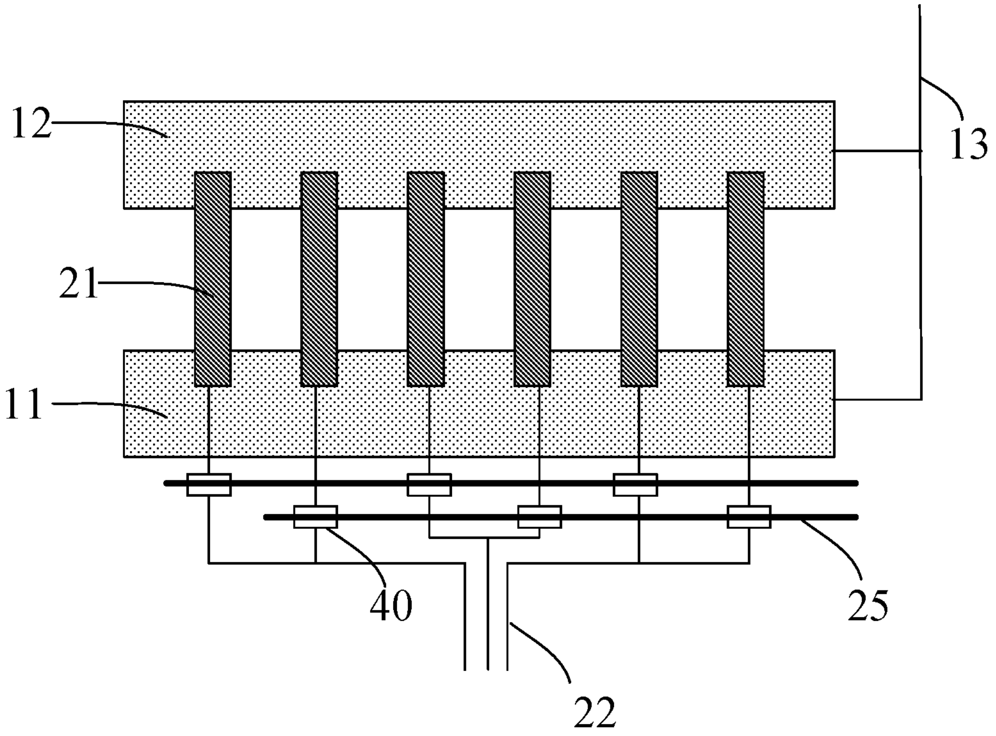
FIG. 8 is a top view of a phase shifter in a fifth example according to an embodiment of the present disclosure.
Figure 9:
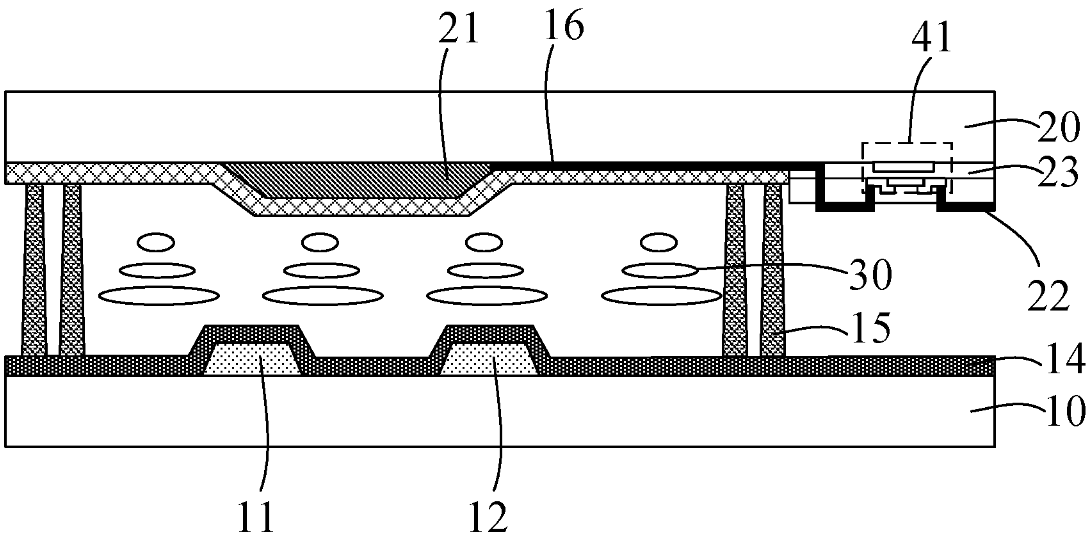
FIG. 9 is a cross-sectional view of a phase shifter in a fifth example according to an embodiment of the present disclosure.

In a fifth example: FIG. 8 is a top view of a phase shifter in a fifth example according to an embodiment of the present disclosure. FIG. 9 is a cross-sectional view of a phase shifter in a fifth example according to an embodiment of the present disclosure. As shown in FIGS. 8 and 9, in this example, each patch electrode 21 is electrically connected to the first bias voltage line 22 corresponding to the patch electrode 21 through a switching unit 40. In FIG. 8, on the basis of the phase shifter in the second example, as an example, each patch electrode 21 is electrically connected to the first bias voltage line 22 corresponding to the patch electrode 21 through the switching unit 40. Switching units 40 connected to the same first bias voltage line 22 are connected to different scanning lines 25. For example: switching units 40 connected to odd-numbered patch electrodes 21 are controlled by using a same scanning line 25, and switching units 40 connected to even-numbered patch electrodes 21 are controlled by using a same scanning line 25. In this case, the switching units 40 are provided, and the patch electrodes 21 are controlled by the scanning lines 25 in combination with the first bias voltage lines 22 to be applied with the first bias voltage, so that the number of the first bias voltage lines 22 can be reduced.

Specifically, when the phase shifter operates, the plurality of scanning lines 25 are sequentially provided with a turn-on level, and switching units 40 corresponding to the scanning line 25 provided with the turn-on level are turned on, so that the first bias voltage lines 22 may transmit the first bias voltage to the corresponding patch electrodes 21, that is, the first bias voltage lines 22 may transmit the first bias voltage to the corresponding patch electrodes 21 in a time-sharing manner, thereby reducing the number of the first bias voltage lines 22.

In some examples, as shown in FIG. 9, the switching unit 40 includes a thin film transistor 41, a first electrode of the thin film transistor 41 is electrically connected to the first bias voltage line 22, a second electrode of the thin film transistor 41 is electrically connected to the patch electrode 21, and a control electrode of the thin film transistor 41 is electrically connected to the scanning line 25.

Specifically, the thin film transistor 41 includes the control electrode disposed on the second dielectric substrate, a gate insulating layer disposed on a side of the control electrode away from the second dielectric substrate 20, an active layer, the first electrode and the second electrode disposed on a side of the gate insulating layer away from the control electrode, and a passivation layer disposed on a side of the active layer, the first electrode and the second electrode away from the gate insulating layer. The patch electrodes 21 are connected to a connection line 16 connected to the second electrode of the thin film transistor 41 through a via extending through the passivation layer, the first bias voltage lines 22 are connected to the first electrode of the thin film transistor 41 through a via extending through the passivation layer, and the scanning lines 25 are connected to the control electrode of the thin film transistor 41.

Figure 10:
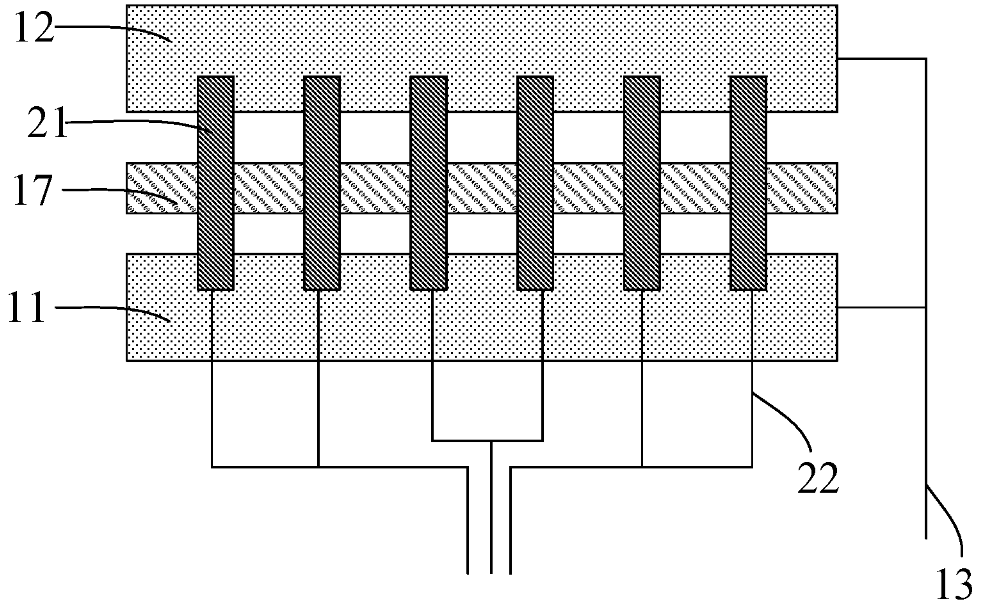
FIG. 10 is a top view of a phase shifter in a sixth example according to an embodiment of the present disclosure.

In a sixth example: FIG. 10 is a top view of a phase shifter in a sixth example according to an embodiment of the present disclosure. As shown in FIG. 10, in this example, the phase shifter is substantially the same in structure as the phase shifter in the second example, except that instead of the two-line transmission line in the above examples, the transmission line in the phase shifter adopts a CPW (coplanar waveguide) transmission line. That is, the first dielectric substrate 10 is provided with not only the first transmission line 11 and the second transmission line 12 but also the signal electrode 17 thereon, and at this time, the first transmission line 11 and the second transmission line 12 are respectively disposed on both sides of an extending direction of the signal electrode 17. The remaining structures may be the same as those in the second example, and thus, the description thereof is not repeated.

In addition, it should be noted that in the sixth example, a modification is made only for the phase shifter in the second example. Similarly, the two-line transmission line may be replaced by the CPW transmission line on the basis of the phase shifter in the first, third, fourth, and fifth examples, which also falls within the scope of the embodiment of the present disclosure.

Accordingly, an embodiment of the present disclosure further provides a method for manufacturing a phase shifter, and the method for manufacturing a phase shifter according to an embodiment of the present disclosure is described below by taking the phase shifter in the first example as an example. The manufacturing method specifically includes the following steps:

S11, providing a first dielectric substrate 10.

The first dielectric substrate 10 includes, but is not limited to, a glass substrate. Step S11 includes cleaning the first dielectric substrate 10 using a standard cleaning process.

S12, forming a first transmission line 11 and a second transmission line 12 on the first dielectric substrate 10.

In some examples, step S12 may include forming a first metal film on the first dielectric substrate 10 as a seed layer by a technique, including, but not limited to, a PVD (physical vapor deposition), then electroplating the seed layer, and finally performing paste coating, exposure, development, and etching (e.g., wet etching) to form a pattern including the first transmission line 11 and the second transmission line 12.

S13, forming a first protective layer 14 on a side of the first transmission line 11 and the second transmission line 12 away from the first dielectric substrate 10.

In some examples, step S13 may include forming the first protective layer 14 through a chemical vapor deposition (CVD) process.

S14, forming support posts 15 on a side of the first protective layer 14 away from the first dielectric substrate 10.

In some examples, the support posts 15 are made of a PS (Photo-spacer) or OC (Optical clear) material, and orthographic projections of the support posts 15 on the first dielectric substrate 10 do not overlap with orthographic projections of the first transmission line 11 and the second transmission line 12 on the first dielectric substrate 10, and do not overlap with orthographic projections of the patch electrodes 21 formed on the second dielectric substrate 20 on the first dielectric substrate 10.

S15, forming a first alignment layer after forming the support posts 15.

In some examples, the first alignment layer may be made of a PI (polyimide) layer. Step S15 may include forming the PI layer through an inkjet process, and then performing a photo-alignment process for the PI layer by using an OA (Optical alignment) equipment.

S16, providing the second dielectric substrate 20.

In some examples, the material of the second dielectric substrate 20 may be the same as the material of the first dielectric substrate 10. S16 may further include cleaning the second dielectric substrate 20 using a standard cleaning process.

S17, forming first bias voltage lines 22 on the second dielectric substrate 20.

In some examples, a first transparent conductive layer may be formed through plasma enhanced chemical vapor deposition (PECVD), and then patterning the first transparent conductive layer by using a dry etching method, to form the first bias voltage line 22.

S18, forming patch electrodes 21 on a side of the first bias voltage lines 22 away from the second dielectric substrate 20.

In some examples, step S18 may include forming a second conductive film in a manner including, but not limited to, sputtering, and performing paste coating, exposure, development, and etching (e.g., wet etching) to form a pattern including the patch electrodes 21.

S19, forming a second protective layer 23 on a side of the patch electrodes 21 away from the second dielectric substrate 20.

In some examples, step S19 may include forming the second protective layer 23 through a CVD process.

S110, forming a second alignment layer on a side of the second protective layer 23 away from the second dielectric substrate 20.

In some examples, the second alignment layer may be made of a PI (polyimide) layer. Step S110 may include forming the PI layer through the inkjet process, and then performing the photo-alignment process for the PI layer by using the OA equipment.

S111, aligning and assembling the first dielectric substrate 10 and the second dielectric substrate 20, and performing a crystal filling after the steps, thereby finishing the manufacturing of the phase shifter.

It should be noted that the order of forming the layers on the first dielectric substrate 10 and the order of forming the layers on the second dielectric substrate 20 may be interchanged, that is, steps S16 to S110 may be before step S11.

The manufacturing method is only an exemplary method for manufacturing the phase shifter, and may further include forming the second bias voltage line 13. For the phase shifter provided with the switching units 40, the steps of forming the switching units 40 and the scanning lines 25 on the second dielectric substrate 20 may be further included, which is not listed here.

Figure 11:
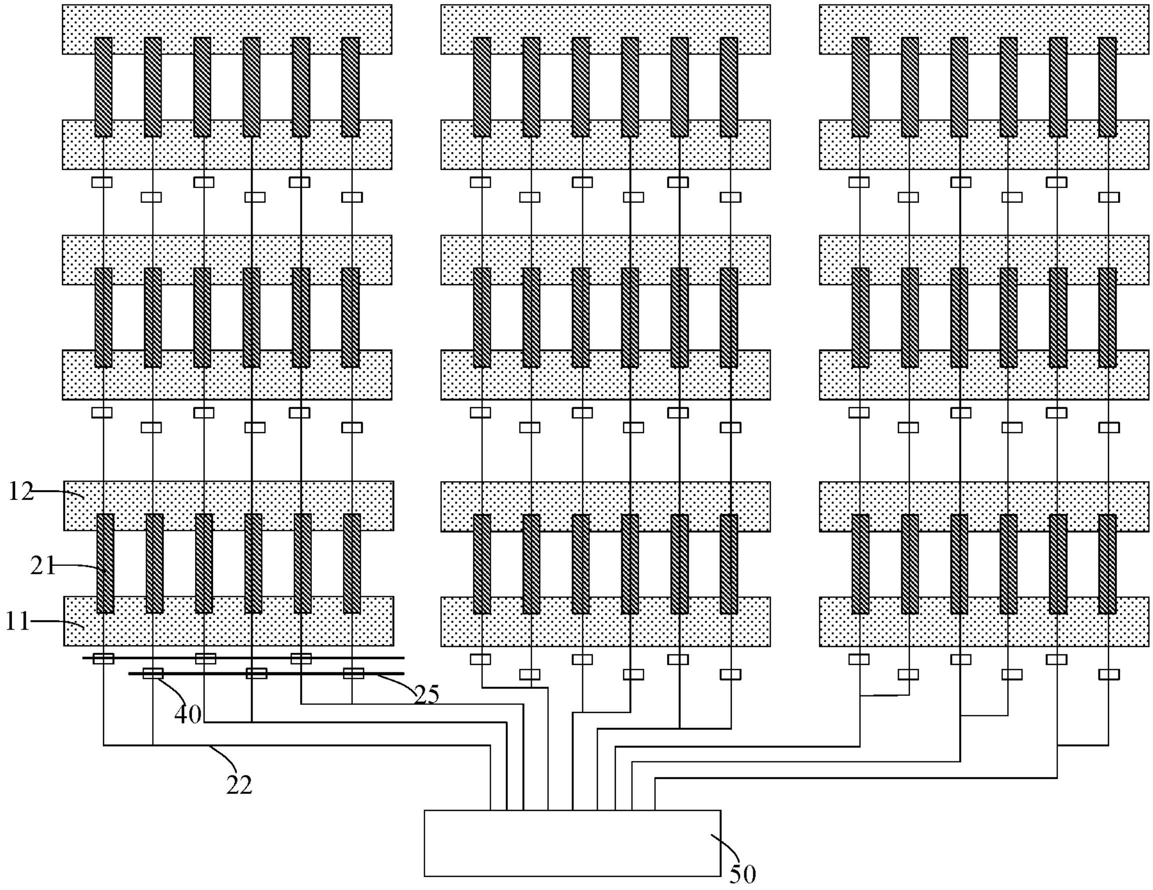
FIG. 11 is a top view of a phase shifter array according to an embodiment of the present disclosure.

In a second aspect, FIG. 11 is a top view of a phase shifter array according to an embodiment of the present disclosure. As shown in FIG. 11, the embodiment of the present disclosure provides a phase shifter array, including a plurality of phase shifters arranged in an array, and each phase shifter may adopt the phase shifter in any one of the embodiments.

In some examples, when each phase shifter adopts the phase shifter in the fifth example, that is, the phase shifter is actively driven, the phase shifters in the same row are arranged such that switching units 40 connected to odd-numbered patch electrodes 21 in each phase shifter are connected to a same scanning line 25, switching units 40 connected to even-numbered patch electrodes 21 in each phase shifter are connected to a same scanning line 25. The phase shifters in the same column are arranged such that the patch electrodes 21 are correspondingly connected to the same first bias voltage line 22 in each phase shifter in the arrangement order. That is, the switching units 40 located in the same row are controlled by the same scanning line 25, and the switching units 40 located in the same column are supplied with the first bias voltage by the same first bias voltage line 22.

Specifically, when the switching unit 40 employs the thin film transistors 41, the control electrodes of the thin film transistors 41 located in the same row are connected to the same scanning line 25, the first electrodes of the thin film transistors 41 located in the same column are connected to the same first bias voltage line 22, and the second electrode of each thin film transistor 41 is connected to the patch electrode 21 corresponding to the thin film transistor 41.

Further, only one first flexible circuit board 50 may be provided in the phase shifter array, and a plurality of first connection pads corresponding to the first bias voltage lines 22 are provided on the second dielectric substrate 20, the first bias voltage lines 22 are connected to the first connection pads in one-to-one correspondence. The first bias voltage is provided through the first flexible circuit board 50 and then is applied to the corresponding patch electrode 21 through the first bias voltage line 22 when the thin film transistor 41 connected to each patch electrode 21 is turned on. In this way, it is not necessary for each patch electrode 21 to be controlled by an independent first bias voltage line 22, so that the number of first bias voltage lines 22 can be reduced, and the difficulty in wiring can be reduced.

Figure 12:
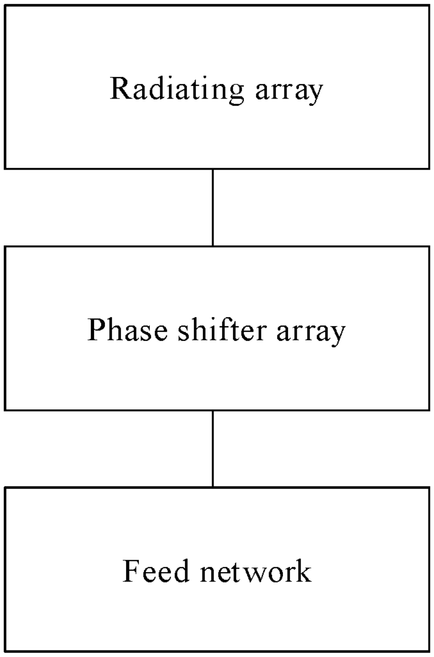
FIG. 12 is a block diagram of an antenna array according to an embodiment of the present disclosure.

In a third aspect, FIG. 12 is a block diagram of an antenna array according to an embodiment of the present disclosure. As shown in FIG. 12, an embodiment of the present disclosure provides an antenna array, which includes the phase shifter array in any one of the embodiments.

In some examples, the antenna array further includes a radiating array including a plurality of radiating units arranged in one-to-one correspondence with the phase shifters in the phase shifter array. The radiating units may be provided on a side of the second dielectric substrate away from the patch electrodes, and configured to receive or send microwave signals. Upon receiving the microwave signal, the radiating units transmit the microwave signal to the phase shifters for phase shifting, and the phase-shifted microwave signal is transmitted by the radiating units.

In some examples, the antenna array includes a feed network configured to feed the phase shifters. For example, the feed network feeds the phase shifter array by any one of a coupling slit, a waveguide or a conductive via.

Specifically, a reference electrode layer, such as a ground electrode layer, may be further disposed on a side of the first dielectric substrate of the phase shifter away from the liquid crystal layer. At this time, a slit opening is provided in the reference electrode layer. One feed port of the feed network is coupled and connected with the phase shifter through the slit opening, so that the feeding in the coupling slit mode is realized. One feed port of the feed network is electrically connected with the phase shifter through a first slit opening and a via extending through the first dielectric substrate, so that the feeding in the conductive via mode is realized. One feed port of the feed network is coupled with the phase shifter through the waveguide and the first slit opening, so that the feeding in the waveguide mode is realized.

In a fourth aspect, an embodiment of the present disclosure provides an electronic device, which may include the antenna array. The electronic device provided by the embodiment of the present disclosure further includes a transceiver unit, a radio frequency transceiver, a signal amplifier, a power amplifier, and a filtering unit. The antenna in the antenna system may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by an antenna in an antenna system and is processed by the filtering unit, the power amplifier, the signal amplifier, and the radio frequency transceiver, the antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the antenna system, the signal amplifier is used for improving a signal-to-noise ratio of the signals output by the radio frequency transceiver and then transmitting the signals to the filtering unit: the power amplifier is used for amplifying the power of the signals output by the radio frequency transceiver and then transmitting the signals to the filtering unit: the filtering unit specifically includes a duplexer and a filtering circuit, the filtering unit combines signals output by the signal amplifier and the power amplifier and filters noise waves and then transmits the signals to the antenna, and the antenna radiates the signals. In the process of receiving signals by the antenna system, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some examples, the signal amplifier may include various types of signal amplifiers, such as a low noise amplifier, without limitation.

In some examples, the electronic device provided by the embodiments of the present disclosure further includes a power management unit connected to the power amplifier to provide the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A phase shifter, comprising a first dielectric substrate and a second dielectric substrate opposite to each other, a first transmission line and a second transmission line on a side of the first dielectric substrate close to the second dielectric substrate, a plurality of patch electrodes on a side of the second dielectric substrate close to the first dielectric substrate, and a tunable dielectric layer between a layer where the first transmission line and the second transmission line are located and a layer where the plurality of patch electrodes are located;

wherein orthographic projections of two ends of each of the plurality of patch electrodes on the first dielectric substrate overlap with orthographic projections of the first transmission line and the second transmission line on the first dielectric substrate, respectively; and wherein at least two of the plurality of patch electrodes are connected to different first bias voltage lines.

2. The phase shifter of claim 1, wherein the plurality of patch electrodes are connected to different first bias voltage lines, respectively.

3. The phase shifter of claim 1, wherein at least two of the plurality of patch electrodes are connected to a same first bias voltage line, and the patch electrodes connected to the same first bias voltage line are adjacent to each other.

4. The phase shifter of claim 3, wherein every two adjacent patch electrodes of the plurality of patch electrodes are connected to the same first bias voltage line, and different first bias voltage lines are connected to different patch electrodes.

5. The phase shifter of claim 1, wherein patch electrodes of the plurality of patch electrodes connected to the same first bias voltage line are separated from each other by at least one patch electrode.

6. The phase shifter of claim 5, wherein each of some first bias voltage lines comprises a first sub-signal line and a second sub-signal line which are sequentially arranged in a direction away from the second dielectric substrate; and the phase shifter further comprises a first interlayer insulating layer between a layer where the second sub-signal line is located and a layer where the first sub-signal line is located; the first sub-signal line and the second sub-signal line are electrically connected to each other by a via extending through the first interlayer insulating layer, and the first sub-signal line is electrically connected to the patch electrodes.

7. The phase shifter of claim 1, wherein each of the plurality of patch electrodes is connected to a corresponding first bias voltage line through a switching unit, and different patch electrodes are connected to different switching units, and the switching units connected to a same first bias voltage line are connected to different scanning lines, respectively.

8. The phase shifter of claim 7, wherein switching units connected to odd-numbered patch electrodes are connected to a same scanning line, and switching units connected to even-numbered patch electrodes are connected to a same scanning line.

9. The phase shifter of claim 7, wherein each switching unit comprises a thin film transistor; a first electrode of the thin film transistor is electrically connected to the first bias voltage line, a second electrode of the thin film transistor is electrically connected to the patch electrode, and a control electrode of the thin film transistor is electrically connected to the scanning line.

10. The phase shifter of claim 1, wherein each first bias voltage line comprises a first sub-signal line and a second sub-signal line which are sequentially arranged in a direction away from the second dielectric substrate; and the phase shifter further comprises a first interlayer insulating layer between a layer where the second sub-signal line is located and a layer where the first sub-signal line is located; a first end of the first sub-signal line is connected to the patch electrode, a second end of the first sub-signal line is connected to a first connection portion; a first end of the second sub-signal line is connected to a second connection portion, and the first connection portion is connected to the second connection portion through a via extending through the first interlayer insulating layer; a line width of the first connection portion is greater than that of the first sub-signal line, and a line width of the second connection portion is greater than that of the second sub-signal line.

11. The phase shifter of claim 7, wherein the first sub-signal line and the second sub-signal line are both made of metal.

12. The phase shifter of claim 1, further comprising a signal electrode on a side of the first dielectric substrate close to the second dielectric substrate, wherein the first transmission line and the second transmission line are respectively on both sides of an extending direction of the signal electrode.

13. The phase shifter of claim 1, further comprising a second bias voltage line electrically connected to the first transmission line and the second transmission line.

14. A phase shifter array, comprising a plurality of the phase shifters in an array, wherein each phase shifter adopts the phase shifter of claim 1.

15. The phase shifter array of claim 14, wherein when each of the plurality of patch electrodes is connected to the corresponding first bias voltage line through the corresponding switching unit, the phase shifters in the same row are arranged such that switching units connected to odd-numbered patch electrodes in each phase shifter are connected to a same scanning line, switching units connected to even-numbered patch electrodes in each phase shifter are connected to a same scanning line; and/or the phase shifters in the same column are arranged such that the patch electrodes are correspondingly connected to the same first bias voltage line in each phase shifter in the arrangement order.

16. An antenna array, comprising the phase shifter array of claim 14.

17. The antenna array of claim 16, further comprising a radiating array comprising a plurality of radiating units in one-to-one correspondence with the plurality of phase shifters in the phase shifter array.

18. The antenna array of claim 16, further comprising a feed network configured to feed the phase shifter array.

19. The antenna array of claim 18, wherein the feed network feeds the phase shifter array by any one of a coupling slit, a waveguide or a conductive via.

20. An electronic device, comprising the antenna array of claim 16.

* * * * *